(12) United States Patent
Srivastava

(10) Patent No.: US 8,566,711 B1
(45) Date of Patent: Oct. 22, 2013

(54) DOCUMENT VIEWS

(75) Inventor: Mohit Srivastava, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 1866 days.

(21) Appl. No.: 11/274,396

(22) Filed: Nov. 14, 2005

(51) Int. Cl.
*G06F 17/00* (2006.01)

(52) U.S. Cl.
USPC .......................................... 715/273; 715/243

(58) Field of Classification Search
USPC .................... 715/204, 273, 243, 246
See application file for complete search history.

(56) References Cited

U.S. PATENT DOCUMENTS

| | | | | |
|---|---|---|---|---|
| 5,898,436 A * | 4/1999 | Stewart et al. | ................ | 345/594 |
| 6,026,416 A * | 2/2000 | Kanerva et al. | ............... | 715/208 |
| 6,097,389 A * | 8/2000 | Morris et al. | ................. | 715/804 |
| 6,457,026 B1 * | 9/2002 | Graham et al. | ............... | 715/234 |
| 6,496,206 B1 * | 12/2002 | Mernyk et al. | ................ | 715/835 |
| 6,613,100 B2 * | 9/2003 | Miller | ........................... | 715/273 |
| 6,895,552 B1 * | 5/2005 | Balabanovic et al. | ........ | 715/209 |
| 6,910,188 B2 * | 6/2005 | Keohane et al. | .............. | 715/751 |
| 6,961,135 B1 * | 11/2005 | Nakagiri et al. | ................ | 358/1.1 |
| 7,055,092 B2 * | 5/2006 | Yardumian et al. | ........... | 715/234 |
| 7,308,641 B2 * | 12/2007 | Shaw et al. | .................... | 715/205 |
| 7,469,380 B2 * | 12/2008 | Wessling et al. | .............. | 715/273 |
| 7,689,933 B1 * | 3/2010 | Parsons | ......................... | 715/838 |
| 7,739,622 B2 * | 6/2010 | DeLine et al. | ................. | 715/835 |
| 7,849,395 B2 * | 12/2010 | Ellis et al. | ..................... | 715/212 |
| 2003/0210281 A1 * | 11/2003 | Ellis et al. | ..................... | 345/838 |
| 2004/0041843 A1 * | 3/2004 | Cui et al. | ...................... | 345/810 |
| 2005/0240865 A1 * | 10/2005 | Atkins et al. | .................. | 715/517 |
| 2006/0036950 A1 * | 2/2006 | Himberger et al. | ........... | 715/732 |
| 2012/0198381 A1 * | 8/2012 | Kumamoto | ................... | 715/781 |
| 2012/0198384 A1 * | 8/2012 | Kumamoto | ................... | 715/786 |

* cited by examiner

*Primary Examiner* — Manglesh M Patel
(74) *Attorney, Agent, or Firm* — Schwegman Lundberg Woessner P.A.

(57) ABSTRACT

Embodiments of methods to store document views, methods to display document views, computer-readable media, user interfaces, and systems are generally described herein.

33 Claims, 12 Drawing Sheets

| | ATTRIBUTE | VIEW | VALUE | VIEW | VALUE | VIEW | VALUE |
|---|---|---|---|---|---|---|---|
| | | 520 | 521 | 522 | 523 | 524 | 525 | 526 |
| 501 | DOC_SIZE | 1 | 4.5 X 3 | 2 | 4.5 X 3 | 3 | 4.5 X 3 |
| 502 | LAY1_COLOR | 1 | WHITE | 2 | WHITE | 3 | WHITE |
| 503 | LAY2_TRANSP | 1 | TRANSP | 2 | TRANSP | 3 | TRANSP |
| 504 | LAY3_TRANSP | 1 | TRANSP | 2 | TRANSP | 3 | TRANSP |
| 505 | OBJ1_COORD | 1 | 2:2 | 2 | 2:2 | 3 | 2:2 |
| 506 | OBJ1_SIZE | 1 | 4.4 X 2.9 | 2 | 4.4 X 2.9 | 3 | 4.4 X 2.9 |
| 507 | OBJ1_WEIGHT | 1 | 9 | 2 | 9 | 3 | 9 |
| 508 | OBJ2_COORD | 1 | 5:5 | 2 | 5:5 | 3 | 5:5 |
| 509 | OBJ2_ORIENT | 1 | ORIGINAL | 2 | ORIGINAL | 3 | FLIP_HORIZ |
| 510 | OBJ3_COORD | 1 | 5:102 | 2 | 5:102 | 3 | 5:102 |
| 511 | OBJ4_COORD | 1 | 20:104 | 2 | 20:104 | 3 | 20:104 |
| 512 | OBJ5_VISIB | 1 | ON | 2 | OFF | 3 | ON |
| 513 | OBJ5_COORD | 1 | 90:10 | 2 | 90:10 | 3 | 90:10 |
| 514 | OBJ5_FONT | 1 | COMMSCRIPT | 2 | COMMSCRIPT | 3 | STACCATO |
| 515 | OBJ6_VISIB | 1 | OFF | 2 | ON | 3 | OFF |
| 516 | OBJ6_COORD | 1 | 65:10 | 2 | 65:10 | 3 | 65:10 |
| 517 | OBJ6_FONT | 1 | COMMSCRIPT | 2 | COMMSCRIPT | 3 | STACCATO |

DOCUMENT VIEWS

TECHNICAL FIELD

Various embodiments described herein relate generally to document management, and more particularly to managing information regarding potentially different representations of a document.

BACKGROUND

Software-assisted document design is prevalent in the printing, graphics, and other industries. In response to user needs, software applications have been developed, which enable a user to design, edit, and render documents. Some software applications provide user interfaces, which enable a user to create documents by placing visual representations of objects on a page at locations that are determined by the user. These objects may include, for example, textual, graphical, and photographic objects, to name a few.

In some cases, a user may create and store multiple versions of a document before settling on a final version. For example, in designing a layout for an advertisement page, a layout designer may experiment with different placements and configurations of the page's objects. During this process, the layout designer may create multiple versions of the layout, where each version may be spawned from one or more prior versions. The designer may save some or all of the versions, so that he or she may revert back to a previous version at a later time. In addition, the designer may want to compare multiple versions on screen and/or in printed output. In both cases, multiple copies of the document need to be saved, where the copies may have the same content but different content layout. When a significant number of versions or renditions of a document are preserved, a substantial amount of data storage resources may be consumed. In addition, managing and tracking the multiple versions or renditions may be difficult and inefficient to implement.

BRIEF DESCRIPTION OF THE DRAWINGS

FIG. 5 is an example of a view repository, in accordance with an example embodiment;

DETAILED DESCRIPTION

Embodiments of the inventive subject matter include methods and apparatus relating to storing and rendering (e.g., iconic display, displaying on-screen or printing) multiple "views" of a document. A "document" may be defined, in some embodiments, as a digitally represented entity, which includes one or more objects, identifiers of one or more objects, or references to one or more objects, among other things. A "view" of a document may be defined, in some embodiments, as the state of the document at a given time represented through a combination of the objects that may be included within the document and a collection of values for various "view attributes." View attribute values may include, for example, integer, floating point, fixed point, Boolean, binary, hexadecimal, text, or other types of values or settings. A "view attribute" may be defined, in some embodiments, as a data element that affects how a document, a layer, and/or an object appears or is rendered. A value of a view attribute may be manipulated by a software application, in response to user inputs, and/or may be manipulated directly by a user from outside the application, in various embodiments. Document "views" and "view attributes" will be described in greater detail later.

Figure 1:
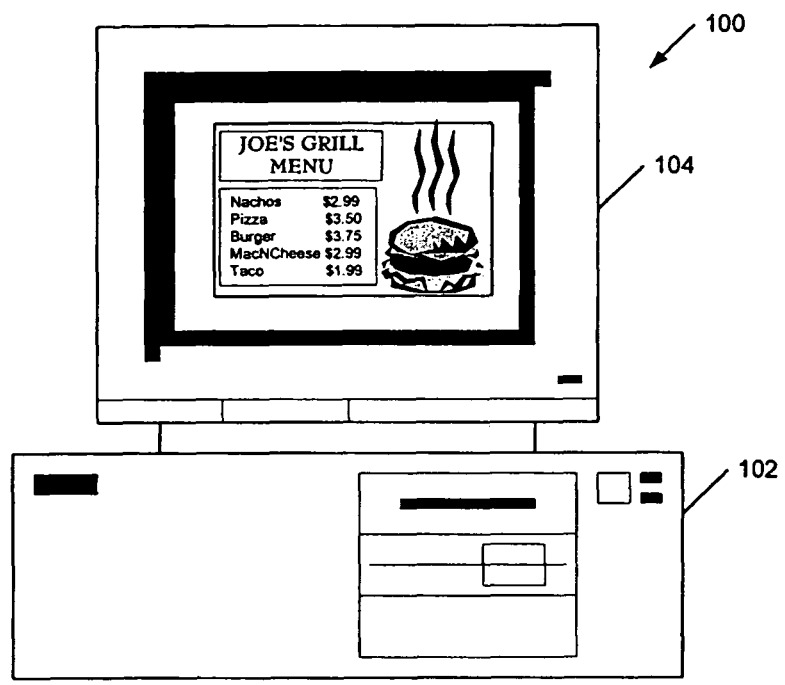
FIG. 1 illustrates a document viewing apparatus, in accordance with an example embodiment.

A document may be viewed on a document viewing apparatus during creation of the document, during editing, and at other times. Further, a document may be encoded onto a tangible computer-readable medium. FIG. 1 illustrates a document viewing apparatus 100, in accordance with an example embodiment. A "document viewing apparatus" may be defined as an apparatus upon which an electronic representation of an object and/or a document may be created, displayed, managed, and/or edited, in conjunction with one or more software applications and/or software-implemented methods.

Document viewing apparatus 100 may include a desktop or laptop computer, a portable electronic device (e.g., a cellular telephone, personal data assistant), a television system, a set-top box, a gaming console, and/or another electronic device, in various embodiments. Document viewing apparatus 100 includes a processing system 102 and a display device 104, in an embodiment. Document viewing apparatus 100 may additionally include various user interfaces (e.g., a keyboard, one or more user pointing devices (e.g., a mouse, trackball, touchpad, joystick)) and/or one or more communication subsystems (not illustrated), which enable document viewing apparatus 100 to send information to and/or retrieve information from external networks via wired or wireless connections, in various embodiment.

Processing system 102 may include one or more processors, memory devices, peripheral electronics, and other components, which enable document viewing apparatus 100 locally to execute one or more software applications, and/or to interact (e.g., over a network) with one or more remotely-executed software applications. Further, processing system 102 may enable document viewing apparatus 100 to access locally-stored or remotely-stored, document-related information.

Processing system 102 additionally may cause display device 104 to display representations of one or more objects and/or documents. Display device 104 may include, for example, a computer monitor or screen, a touchscreen, a display (e.g., a liquid crystal display), or another apparatus capable of visually displaying a representation of an asset or document version.

Document viewing apparatus 100 may have stored upon it (or may be capable of accessing) one or more software applications or software-implemented methods, which provide a user with the abilities to access, create, modify, and/or edit objects and/or documents. For example, but not by way of limitation, these software applications may be selected from a group of applications that includes a document creation and/or viewing application, an image manipulation application, an image viewing application, a layout design application, and/or a webpage and/or mobile device document authoring application. More generally, embodiments of the inventive subject matter may be implemented by "producer applications" and/or "consumer applications." A producer application may create files by generating a device-independent description of the desired output in a page description language (e.g., a language for describing the graphical appearance of pages with respect to an imaging model). A consumer application may read existing files and interpret or modify their contents. A program controlling a specific output device interprets the description and renders it on that device (e.g., a printer or display device). A consumer application may process a file by following references from object to object, or by processing objects sequentially.

In an embodiment, document viewing apparatus 100 may alternatively or additionally have stored upon it (or may be capable of accessing) one or more software applications of software-implemented methods, which are capable of managing and/or accessing document views. For example, but not by way of limitation, document viewing apparatus 100 may include one or more software applications selected from a group of applications that includes a version control application, a configuration management application, an asset management application, and/or a project or file sharing application.

In some embodiments, document viewing apparatus 100 may enable a user to create, display, and/or edit a representation of a document, such as the document represented on display device 104, for example. In various embodiments, a "document" may be defined as a data entity, which includes one or more objects that convey information. A document may be represented using a single page, or it may include multiple pages, where the objects associated with each page define the content and appearance of each pages, for example.

A document may have a flat or a structured format. In an embodiment, document views may be implemented in a structured document. A "structured document" may be defined as a document that includes content and a structure tree. "Content" may be defined as graphical or textual representation of concepts, ideas, or information to be communicated. A "structure tree" may be defined as information (e.g., hierarchical information) that may be used to arrange the objects or content of a document on one or more pages.

Structured documents may be formatted using a standard or proprietary document format, including but not limited to, PDF (Portable Document Format), PostScript, XML (eXtensible Markup Language), HTML (HyperText Markup Language), SGML (Standard Generalized Markup Language), and DAFS (Document Attribute Format Specification), to name a few. Although documents formatted using particular formats may be described herein, it is to be understood that embodiments of the inventive subject matter also may apply to documents that are otherwise formatted. For example, but not by way of limitation, embodiments may apply to documents formatted using character codes, such 7-bit ASCII (American Standard Code for Information Interchange) character codes.

Data may be stored within a structured document in the context of one or more objects. An "object" may be defined, in some embodiments, as an area of image of a document (e.g., a rectangular area). The area may be defined by a bounding box, in some embodiments.

An "object" also or alternatively may be defined, in some embodiments, as a logical software unit that includes content (e.g., text), attributes (e.g., bounding box, font and point size), and hierarchical information (e.g., information specifying read order and page layout). In an embodiment, an object may be queried, and the object may return data in response. For example, an object may be queried as to its type, the number of words that it contains, and its location in coordinates (e.g., the location of the object's bounding box), among other things.

Object types may include, for example, document objects, page objects, column objects, paragraph objects, line objects, word objects, glyph objects, graphical objects (e.g., path objects, text objects, and/or image objects), page contents objects (including text characters, words, etc. and/or graphical objects such as polygon shapes, commands, etc.), image objects (e.g., bitmaps), font objects, and user-specified objects, to name a few. Some objects may include references to other objects, and/or information used to display the object. In a PDF document, for example, a page object may reference a page contents object that includes commands and text characters, where the text characters are provided as character codes representing the identity of the text characters. The page contents object may include the location to display the text, such as coordinates used to display a bounding box around the text, and other information, such as the size and orientations of the characters. The page contents object also may refer to "shared objects," such as fonts.

Figure 2:
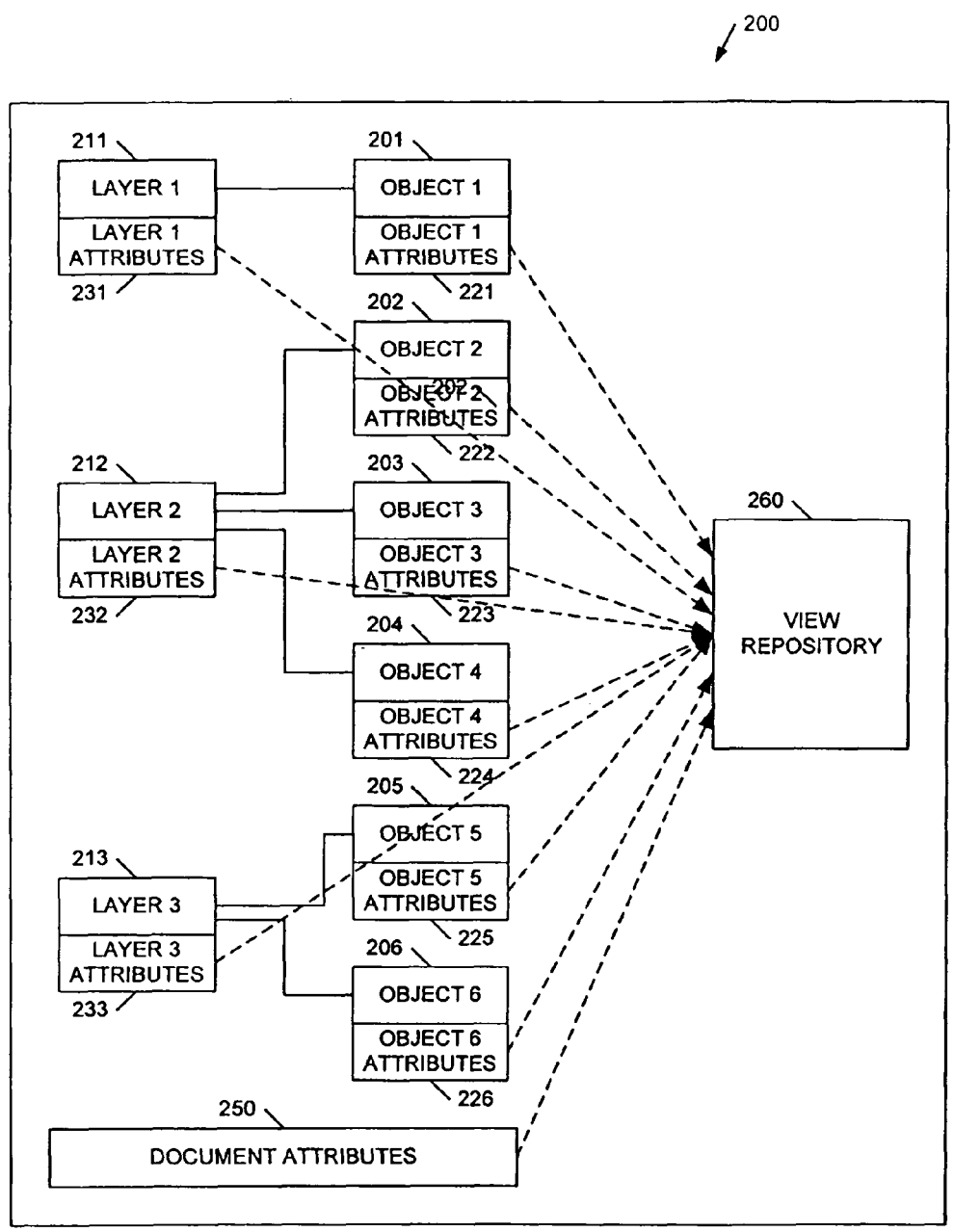
FIG. 2 is a conceptual diagram of a document, in accordance with an example embodiment.

FIG. 2 is a conceptual diagram of a document 200, in accordance with an example embodiment. A document, such as document 200, may include from one to many objects 201, 202, 203, 204, 205, 206. In an embodiment, objects 201-206 may be arranged in a document within a set of image layers 211, 212, 213. In other embodiments, objects may not be arranged in layers. Although six objects 201-206 are shown to be arranged on three image layers 211-213, these quantities are for example purposes only, and more or fewer objects and/or layers may exist within a document, and/or the object/layer arrangements could be different from that illustrated.

Each layer 211-213 may include zero or more objects 201-206. In the example illustrated, layer 211 includes one object 201, layer 212 includes three objects 202-204, and layer three 213 includes two objects 205, 206.

The document, its layers 211-213, and/or the objects 201-206 each may have one or more attributes associated with them. An "attribute" may be defined, in some embodiments, as a data element that is used to classify an object and its contents. A subset of a document's "attributes" includes its "view attributes." A "view attribute" may be defined, in some embodiments, as a data element that affects how some portion or all of a document appears or is rendered. View attributes may exist at a document level, a layer level, and/or an object level.

Selected ones of objects 201-206 may have object-level view attributes 221, 222, 223, 224, 225, 226 associated with them. Object-level view attributes 221-226 may include, for example but not by way of limitation, position (e.g., co-ordinates), bounding box, height, width, printability, transformation, visibility, transparency or opacity, color, font, point size, bold, and italic, to name a few. Selected ones of layers 211-213 may have layer-level view attributes 231, 232, 233 associated with them. Layer-level view attributes 231-233 may include, for example but not by way of limitation, color, scale, height, width, position (e.g., co-ordinates), visibility, background, clipping, stacking order, and layer effects, to name a few. Further, document 200 may have document-level view attributes 250 associated with it. Document-level view attributes may include, for example but not by way of limitation height, width, paper size, margins, and background, to name a few. Thus, at a given time, the appearance of a document may be defined by a collection of view attributes, which may include document-level, layer-level, and/or object-level attributes. Each of the view attributes may have a mutable value.

A "view" of a document may be defined, in various embodiments, as the values for a collection of view attributes associated with the document and the objects and layers that make up the document. In various embodiments, multiple views of a document may be identified and stored within a document during a view encoding process. Each of the multiple views may have different values for the collection of view attributes. In various embodiments, a software application may define the attributes that constitute a view, and/or a user may define attributes that constitute a view. After encoding multiple views within the document, a user may select a view to be enabled (e.g., for rendering), in various embodiments. The values of the view attributes for the selected view may then be retrieved from the document during a reverse encoding process, and the selected view of the document may be rendered.

In an embodiment, multiple views of a document may be stored within the document itself. Each of the multiple views may be represented by a collection of objects and view attributes values, at a given time. In an embodiment, one or more document views may be stored within a view repository 260 within document 200. An example of a view repository will be described in more detail later, in conjunction with FIG. 5. In an embodiment, a document view and/or a view repository may be stored as embedded information (e.g., metadata) within the document. Metadata may be embedded in documents, for example, using a labeling technology, such as Extensible Metadata Platform (XMP) conformant XML packets, XML blobs, writable XML packets, and so on. Alternatively, the document view data storage can be natively supported by the document format. Besides document views information, embedded information may also include, for example but not by way of limitation, information such as title, status, keywords, file descriptions, author, copyright, file type, content-related information such as image types and dimensions, and other information.

Image layers 211-213 are analogous to stacked transparency sheets, and a final image may be generated by stacking image layers 211-213 together. The bottom layer (e.g., layer 211) may represent a background or bottom sheet, whereas the other layers (e.g., layers 212-213) may represent transparency sheets that are stacked on the background. This stacking process may be referred to as "compositing." The color and density of ink on a transparency sheet controls the extent to which portions of the sheet obscure corresponding portions of underlying sheets. As implemented in a software application, the color and density of the ink on a transparency sheet may be represented in a given location on the page (e.g., a pixel) by a color value and an opacity (e.g., "alpha") value, respectively.

Figure 3:
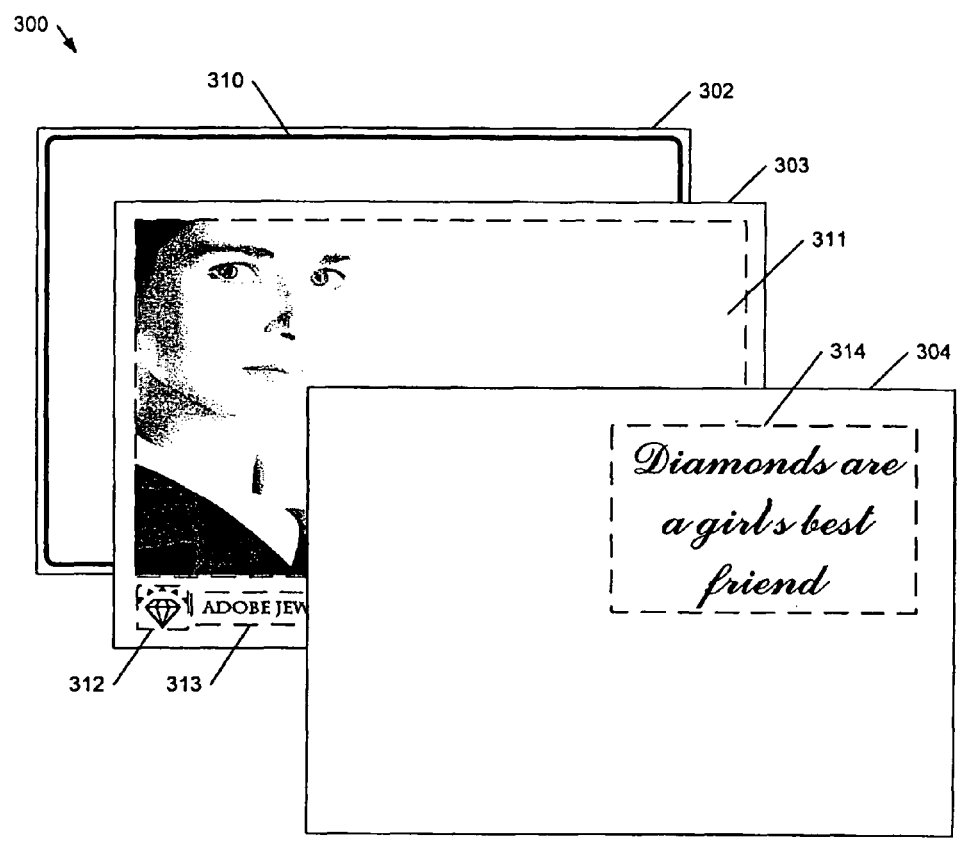
FIG. 3 is a visual representation of multiple layers associated with a first view of a layout, in accordance with an example embodiment.

FIG. 3 is a visual representation of multiple layers 302, 303, 304 associated with a first view of a layout 300, in accordance with an example embodiment. The example layout may be an advertisement, for example. A number of objects 311, 312, 313, 314 appear on the layers 302-304. For illustration purposes, the bounding boxes of objects 311-314 are illustrated as dashed lines. During actual rendering, these bounding boxes may or may not appear. For purposes of explaining the inventive subject matter, the various elements of FIG. 3 will be correlated with the various elements of FIG. 2.

Referring first to FIG. 3, a first layer 302 of the layout 300 may represent a bottom layer. First layer 302 may, for example, correspond to layer 211 of FIG. 2, and accordingly, first layer 302 may have certain attributes (e.g., layer attributes 231, FIG. 2). First layer 302 is shown to include one object, which is border object 310. Border object 310 may, for example, correspond to object 201 of FIG. 2, and accordingly, border object 310 may have certain attributes (e.g., object attributes 221, FIG. 2).

A second layer 303 may represent an overlay of the first layer 302. Second layer 303 may, for example, correspond to layer 212 of FIG. 2, and accordingly, second layer 303 may have certain attributes (e.g., layer attributes 232, FIG. 2). Second layer 303 is shown to include three objects, which are photo object 311, diamond logo object 312, and store information object 313. For example, photo object 311 may correspond to object 202 of FIG. 2, diamond logo object 312 may correspond to object 203 of FIG. 2, and store information object 313 may correspond to object 204 of FIG. 2. Accordingly, photo object 311 may have certain attributes (e.g., object attributes 222, FIG. 2), diamond logo object 312 may have certain attributes (e.g., object attributes 223, FIG. 2), and store information object 313 may have certain attributes (e.g., object attributes 224, FIG. 2).

Finally, a third layer 304 may represent an overlay of the first two layers 302, 303. Third layer 304 may, for example, correspond to layer 213 of FIG. 2, and accordingly, third layer 304 may have certain attributes (e.g., layer attributes 233, FIG. 2). Third layer 304 is shown to include one object, which is tagline object 314. Tagline object may, for example, correspond to object 205 of FIG. 2, and accordingly, tagline object 314 may have certain attributes (e.g., object attributes 225, FIG. 2). In addition, as will be explained in more detail below, third layer 304 may include one or more additional objects (e.g., object 206, FIG. 2) which have certain attributes (e.g., object attributes 226, FIG. 2). One of the object attributes may be a "visibility" object attribute, which may have a value of "off" or "on." When a visibility object attribute is "off," then the object may not be displayed or otherwise rendered. In the illustrated example, the visibility object attribute of object 206 is off, and accordingly it is not illustrated on third layer 304.

As described above, selected ones of or each of the visible layers 302-304 and objects 310-314 may have one or more view attributes, which affect the way that the layers 302-304 and objects 310-314 appear. Further, the entire document may have one or more view attributes, as well (e.g., document attributes 250, FIG. 2). When layers 302, 303, and 304 are composted together, the final layout will have an appearance that is affected by these view attributes.

Figure 4:
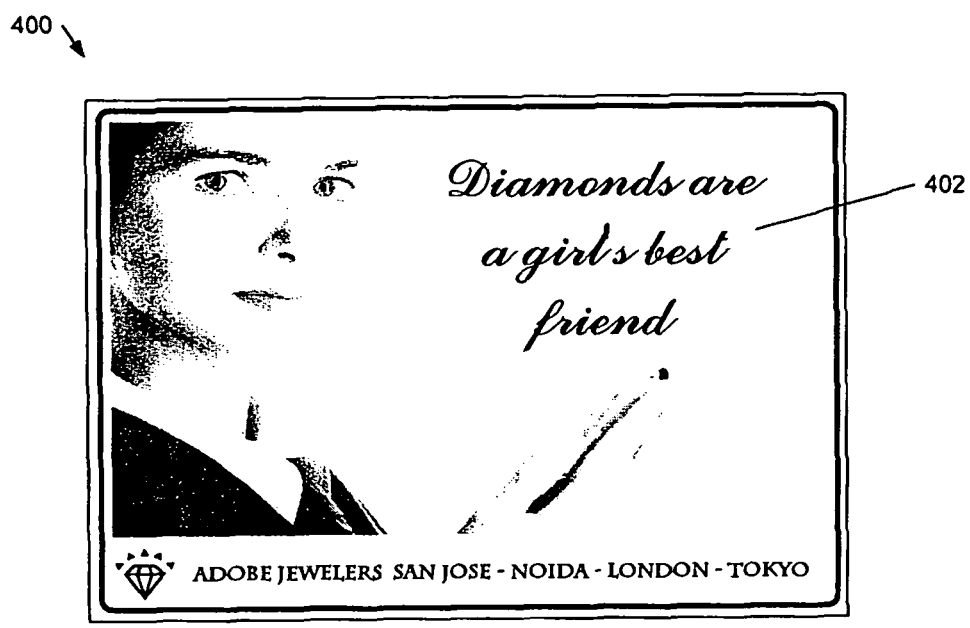
FIG. 4 is a visual representation of a first view of a composted layout, in accordance with an example embodiment.

FIG. 4 is a visual representation of a first view of a composted layout 400, in accordance with an example embodiment. Among other things, the first view has an English-language tagline object 402 (e.g., "Diamonds are a girl's best friend"). This tagline object 402 will be referred to later to point out features of the inventive subject matter.

Composted layout 400 may represent, for example, a stacked version of layers 302-304 of FIG. 3, as they may appear when rendered (e.g., printed or displayed). As the composted layout 400 illustrates, the transparency of upper layers (e.g., layers 303, 304) enables objects on lower layers (e.g., layers 302, 303) to be visible in the final rendering. Transparency is a view attribute that may be expressed on a layer level and/or on an object level.

The layout 400 illustrated in FIG. 4 may represent a first view of a document, which will also be referred to herein as "view 1." In accordance with various embodiments, a user may cause "view 1" to be stored within the document as one of multiple views. For example, "view 1" may be stored in a view repository (e.g., view repository 260, FIG. 2). A user may alter the values of the document-level, layer-level, and/or object-level attributes of "view 1," and may then cause a second view (e.g., "view 2") of the document to be stored within the document. The user may further alter the values of the document-level, layer-level, and/or object-level attributes of either "view 1" or "view 2," and cause a third view (e.g., "view 3") of the document to be stored within the document, and so on. In accordance with various embodiments, multiple views of a document may be stored within the document itself, with each view being represented by potentially differing values of view attributes associated with the document, its layers, and/or its objects. Although the view attribute values may differ from view to view, some or all of the view attribute values may be the same from view to view.

As mentioned previously, multiple views may be stored within a document within a view repository (e.g., view repository 260, FIG. 2). FIG. 5 is an example of a view repository 500, in accordance with an example embodiment. A document with its associated view repository 500 may be encoded onto a tangible computer-readable medium.

View repository 500 may include a data structure, which associates view attributes with view identifiers and attribute values. In an embodiment, view repository 500 includes multiple view attribute entries 501, 502, 503, 504, 505, 506, 507, 508, 509, 510, 511, 512, 513, 514, 515, 516, 517, where each entry may correspond to a document-level, layer-level, or object-level attribute. For example purposes, entry 501 corresponds to a document-level attribute called "DOC_SIZE," entries 502-504 correspond to layer-level attributes called "LAY1_COLOR," "LAY2_TRANSP," and "LAY3_TRANSP," respectively. Finally entries 505-517 correspond to various object-level attributes.

In an embodiment, the attributes included within a view may be selectable by a user. This means that the user may determine which attributes are considered to be "view attributes," as opposed to regular attributes that are not managed as part of a view. In another embodiment, an application program may have certain criteria that it uses to determine whether an attribute is to be considered a "view attribute" or a regular attribute. For example, but not by way of limitation, the application program may automatically characterize an attribute of the document, a layer, or an object as a "view attribute" when a change in the value of the attribute may alter the way that the document, the layer, or the object appears when rendered.

A view attribute entry (e.g., entry 501) may include an attribute name field 520, one or more view identifier fields 521, 523, 525, and one or more attribute value fields 522, 524, 526. In an embodiment, view repository 500 includes a relational data structure, where fields may be determined to be associated with one another based on various keys. For example, a common view identifier (e.g., "1" in field 521) may be used as a key to associate view attribute values for a particular view.

In view repository 500, three views are stored, and the three views are identified with integers "1," "2," and "3" in fields 521, 523, and 525. In the given example, for "view 1" (field 521), each attribute named in field 520 has an attribute value as indicated in attribute value fields 522. Accordingly, "view 1" may be considered to include the set of attribute values in attribute value fields 522. Similarly, for "view 2" (field 523), each attribute named in field 520 has an attribute value as indicated in attribute value fields 524. Accordingly, "view 2" may be considered to include the set of attribute values in attribute value fields 523. Finally, for "view 3"(field 525), each attribute named in field 520 has an attribute value as indicated in attribute value fields 526. Accordingly, "view 3" may be considered to include the set of attribute values in attribute value fields 526.

For purposes of explaining the inventive subject matter, various elements of FIG. 5 will be correlated with some of the elements of FIG. 3. "View 1," for example, may be represented by the layout depicted in FIG. 3. Correlating FIG. 3 with FIG. 5, an attribute corresponding to a background color of layer 311 of FIG. 3 may be layer-level attribute 502 "LAY1_COLOR" of FIG. 5. The value of "LAY1_COLOR" for "view 1" is "WHITE," as indicated in column 522. As another example, an attribute corresponding to a visibility of tagline object 314 of FIG. 3 may be object-level attribute 512 "OBJ5 VISIB" of FIG. 5. The value of "OBJ5 VISIB" for "view 1" is "ON," as indicated in column 522. Accordingly, for "view 1," object 5 will be visible when the document is rendered.

The selection of attributes and attribute values in FIG. 5 are for illustration purposes only. A view repository may include more, fewer, and/or different attributes and/or attribute values. Further, the data structure of FIG. 5 may be arranged in any of a number of ways, and a particular arrangement is illustrated in FIG. 5 for explanation purposes only. For example, the data structure illustrated in FIG. 5 may be stored in contiguous address locations, as illustrated. In other embodiments, the data structure may be distributed in non-contiguous address locations. For example, in a particular document, the view attributes and values for a particular layer or object may be stored within the document in conjunction with the particular layer or object, rather than being stored with view attributes for other layers and/or objects. Additionally, depending on the way that the view attribute values are stored, the view identifier fields (e.g., fields 521, 523, 525) may not need to be replicated for each of the attributes. Certain fields illustrated in FIG. 5 may be deleted or replicated, and/or other fields may be present, while still achieving the same result. Numerous ways of storing and arranging the information within a view repository may be possible, and alternate ways of storing and arranging the information are intended to be included within the scope of the inventive subject matter.

As mentioned above, view repository 500 includes three views, identified as "1," "2," and "3." As mentioned previously, "view 1" may be represented by the layout illustrated in FIG. 4. Second and third views (also referred to herein as "view 2" and "view 3") may be represented by layouts illustrated in FIGS. 6 and 7.

Figure 6:
FIG. 6 is a visual representation of a second view of a composted layout, in accordance with an example embodiment.

FIG. 6 is a visual representation of a second view of a composted layout 600, in accordance with an example embodiment. For purposes of explaining the inventive subject matter, FIG. 6 will be discussed in conjunction with some of the elements of FIGS. 2, 4, and 5.

Layout 600, which represents "view 2" of a document, has a Spanish-language tagline object 602 (e.g., "Los diamantes el major amigo de la chica"). The Spanish-language tagline object 602 may correspond to object 6 (e.g., object 206, FIG. 2), which may have object level attributes (e.g., attributes 226, FIG. 2). Different values for the object level attributes of object 6 may be stored in a view repository (e.g., view repository 500, FIG. 5). The different values for the object level attributes for object 6 may be stored, for example, as attributes 515-517 of FIG. 5.

Layout 600 differs from layout 400 (FIG. 4). In contrast to layout 600 of FIG. 6 (e.g., "view 2"), layout 400 (e.g., "view 1") has an English-language tagline object 402 (e.g., "Diamonds are a girl's best friend"). The English-language tagline object 402 (FIG. 4) may correspond to object 5 (e.g., object 205, FIG. 2), which may have object level attributes (e.g., attributes 225, FIG. 2). Different values for the object level attributes of object 5 may be stored in a view repository (e.g., view repository 500, FIG. 5). The different values for the object level attributes for object 5 may be stored, for example, as attributes 512-514 of FIG. 5.

As indicated previously, the values of various view attributes may affect the way that corresponding objects, layers, and/or the document are rendered. For example, the values of object-level view attributes regarding object visibility may affect whether or not the corresponding objects are rendered. In "view 1" (FIG. 4), the English-language tagline object 402 is visible, and the Spanish-language tagline object (e.g., object 602, FIG. 6) is not visible. Similarly, in "view 2" (FIG. 6, the Spanish-language tagline object 602 is visible, and the English-language tagline object (e.g., object 402, FIG. 4) is not visible.

When a view is selected for rendering, the view attribute values for the selected view are accessed from the view repository. For example, referring to view repository 500 of FIG. 5, for "view 1," attribute 512 "OBJ5_VISIB" has a value of "ON," and attribute "OBJ6_VISIB" has a value of "OFF," as indicated in column 522. Accordingly, "view 1" (FIG. 4) depicts the English-language tagline object 402, but not the Spanish-language tagline object. For "view 2," attribute 512 "OBJ5_VISIB" has a value of "OFF," and attribute "OBJ6_VISIB" has a value of "ON," as indicated in column 524. Accordingly, "view 2" (FIG. 6) depicts the Spanish-language tagline object 602, but not the English-language tagline object.

Figure 7:
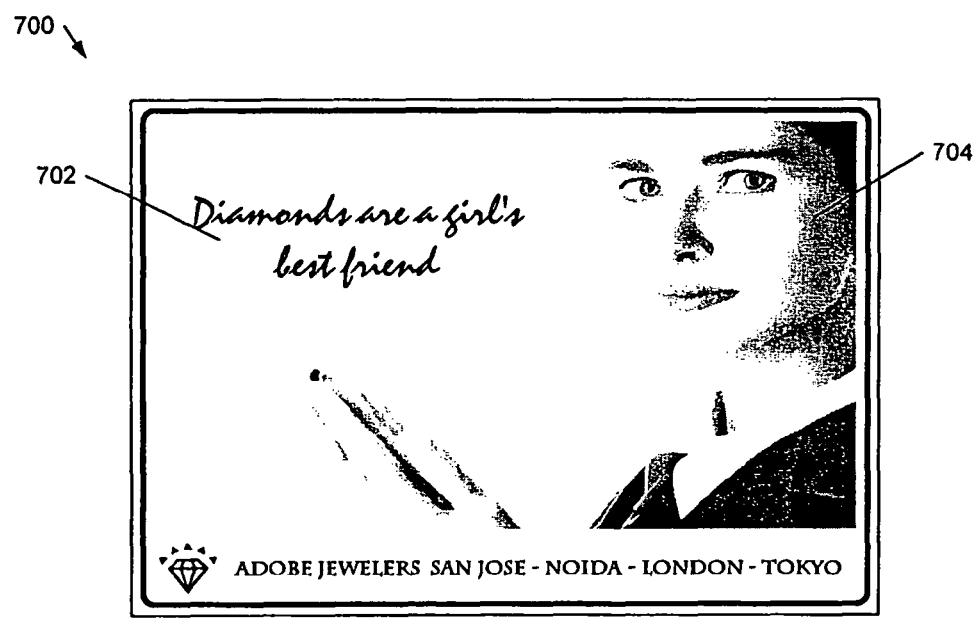
FIG. 7 is a visual representation a third view of a composted layout, in accordance with an example embodiment.

FIG. 7 is a visual representation a third view of a composted layout 700, in accordance with an example embodiment. For purposes of explaining the inventive subject matter, FIG. 7 will be discussed in conjunction with some of the elements of FIGS. 2, 4, and 5.

Layout 700, which represents "view 3" of a document, has a tagline object 702 (e.g., "Diamonds are a girl's best friend"). The tagline object 702 may correspond to object 5 (e.g., object 205, FIG. 2), which may have object level attributes (e.g., attributes 225, FIG. 2).

Layout 700 differs from layout 400 (FIG. 4). In contrast to layout 400 of FIG. 4, the tagline object 702 of layout 700 (e.g., "view 3") uses "Staccato" font, rather than "Comm Script" font. This difference is reflected in the values for the "OBJ5_FONT" attribute 514 (FIG. 5) for "view 3" (field 525) and "view 1" (field 521). In addition, the tagline object 702 of layout 700 (e.g., "view 3") is located at different coordinates than the tagline object 402 of layout 400 (e.g., "view 1"). This difference is reflected in the values for the "OBJ5_COORD" attribute 513 (FIG. 5) for "view 3" (field 525) and "view 1" (field 521).

Layout 700 (e.g., "view 3") also has a photograph object 704. The photograph object 704 may correspond to object 2 (e.g., object 202, FIG. 2), which may have object level attributes (e.g., attributes 222, FIG. 2).

In a second way, layout 700 differs from layout 400 (FIG. 4). In contrast to layout 400 of FIG. 4, the photograph object 704 of layout 700 (e.g., "view 3") shows the subject at the right side of the layout. This difference is reflected in the values for the "OBJ2_ORIENT" attribute 509 (FIG. 5) for "view 3" (field 525) and "view 1" (field 521). In particular, the "OBJ2_ORIENT" attribute value for "view 1" is "ORIGINAL," and the "OBJ2_ORIENT" attribute value for "view 3" is "FLIP_HORIZ," indicating that the photograph object is flipped horizontally from its original orientation.

Figure 8:
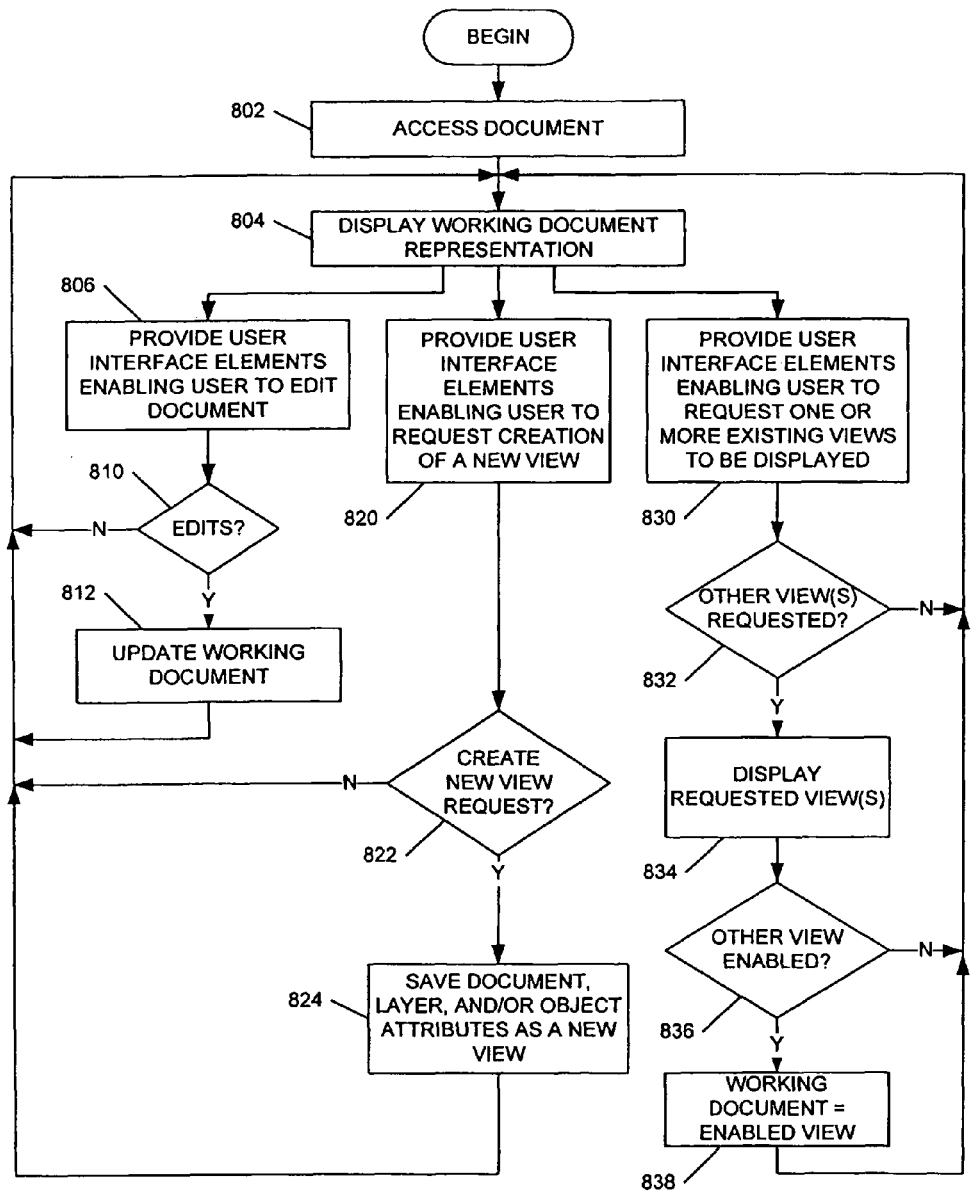
FIG. 8 is a flowchart of a method for creating document views, and causing document views to be rendered, in accordance with an example embodiment.
Figure 9:
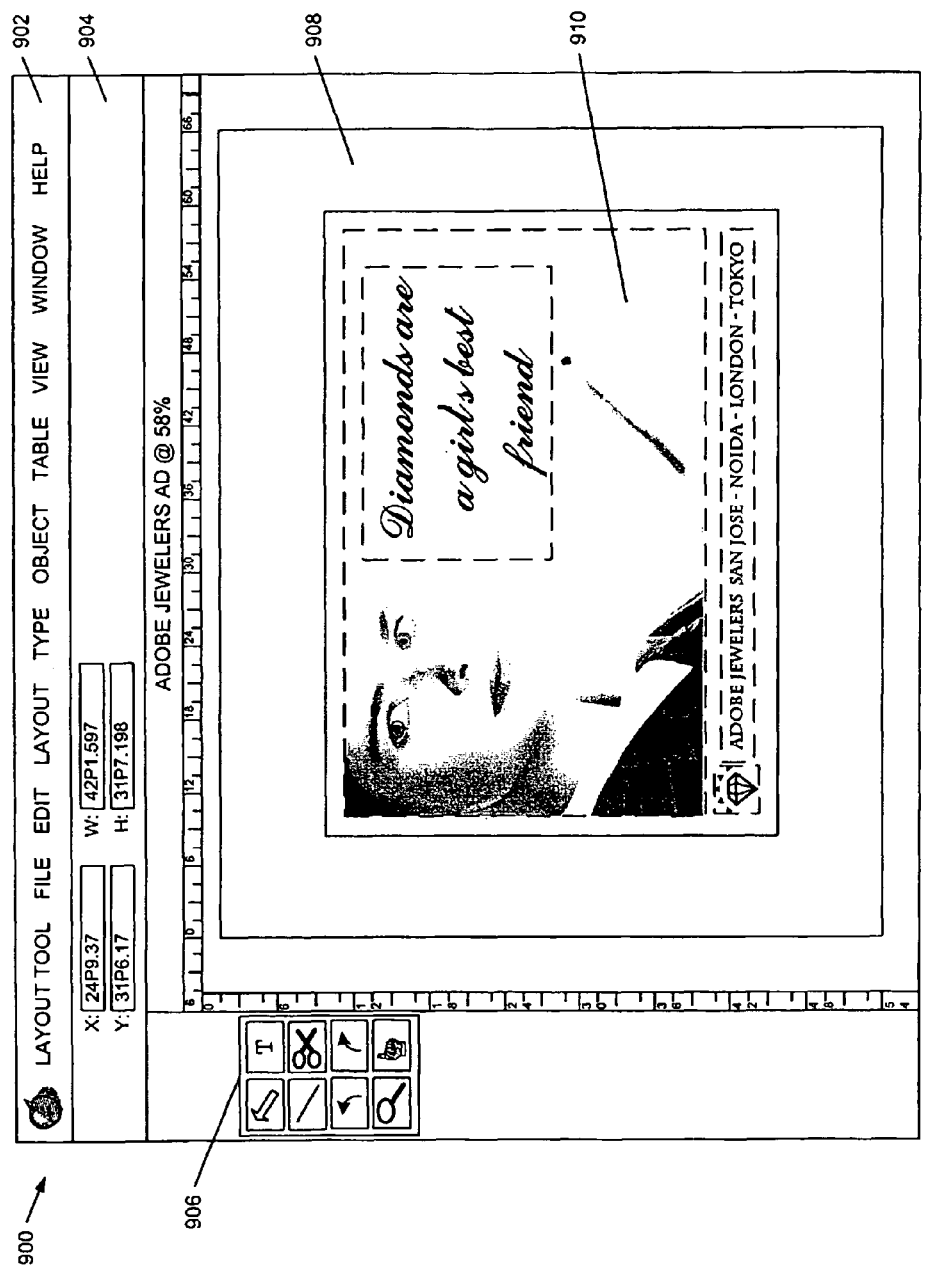
FIG. 9 illustrates a first depiction of a layout editing window of a layout design software application, in accordance with the hypothetical example and an example embodiment.
Figure 10:
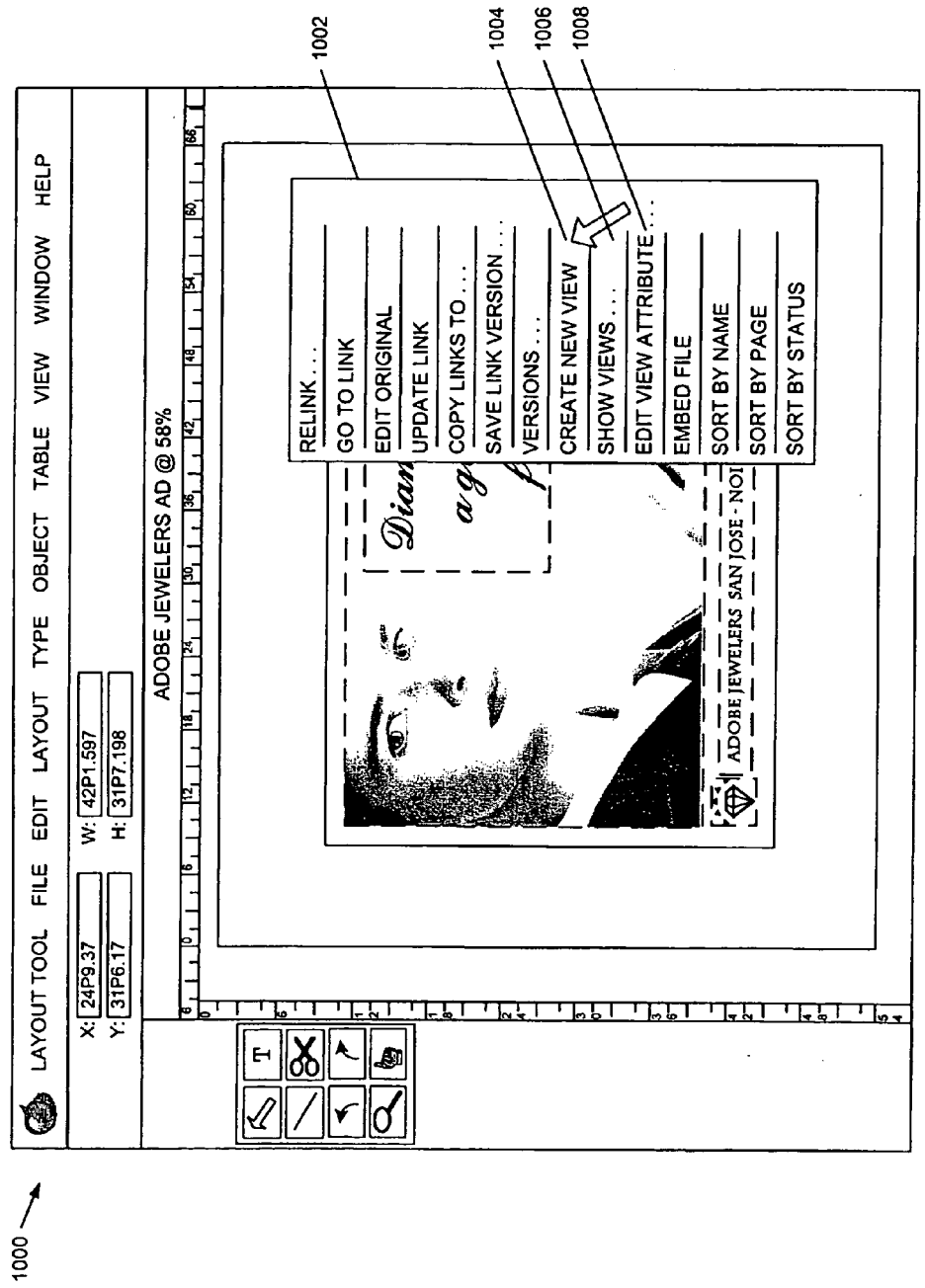
FIG. 10 illustrates layout editing window, after a user has provided one or more user inputs to reveal a window element which enables the user to indicate that he would like to have a working document saved as a new view, in accordance with an example embodiment.

FIGS. 8-10 are provided to describe and to illustrate embodiments of methods for creating and rendering document views, and example windows or screen-shots, which are provided by graphical user interfaces. The use of windows is not meant to limit application of the inventive subject matter to use on devices that support a Microsoft Windows operating system. Instead, embodiments of the inventive subject matter may be implemented on devices that support Macintosh, UNIX, Linux or other proprietary or non-proprietary operating systems.

A "user interface" may include one or more user interface elements that may be displayed by a computer, providing prompts for a user to provide information. A user interface may additionally or alternatively include various hardware or software-implemented means for a computer to receive information from a user. The term "window" is meant to include an area of a display screen where information is displayed, and includes windows produced by an operating system, application software, and/or a browser, among other things. The various method embodiments are depicted using a flowchart. It is to be understood that the processes described in conjunction with the flowchart may be performed in different orders from the order illustrated. Further, although a flowchart is illustrated, it is to be understood that some of the processes may be initiated upon receipt of a command or interrupt, rather than as a result of a decision or process that may have occurred elsewhere in the flowchart. Some of the processes illustrated in the flowchart may be performed sequentially or in parallel, and they may be combined or broken into smaller processes.

It is to be understood that windows, such as those depicted in the Figures, may be provided to a user's computer screen or monitor by a software application, such as a browser, and/or a document creation and/or viewing application, an image manipulation application, an image viewing application, a layout design application, and/or a webpage and/or mobile device document authoring application. The various example windows described herein may include a number of "window elements," which may be selected and/or manipulated by a user, via a user interface, to produce a desired effect. For example, window elements may include one or more elements selected from a group of elements that includes, but is not limited to, icons, buttons, lists, radio buttons, check boxes, drop-down menus, pop-up menus, pop-up windows, text input fields, file or application descriptors, and other elements, which the user may select and/or manipulate via the user interface. Although the description and Figures may identify a particular type of window element as providing a user with the ability to produce a desired effect, it is to be understood that the types of window elements selected are for the purposes of illustration, and not of limitation. It is to be further understood that production of desired effects may be achieved using other types of window elements than those described. For example, if a user wishes to select an item (e.g., a file), the user may make that selection by clicking a button, selecting the item from a list, clicking an icon or thumbnail, or otherwise, in various embodiments.

FIG. 8 is a flowchart of a method for creating document views, and causing document views to be rendered, in accordance with an example embodiment. The processes involved in the method embodiments may be performed on a computer or other electronic device, which is capable of locally running or remotely accessing a software application that enables document views to be created.

The description below will transition between FIG. 8 and FIGS. 9-11, which illustrate examples of windows having features that may be used in conjunction with the method embodiments. For purposes of description, the example embodiments discussed in conjunction with FIGS. 8-11 depict a layout open in a layout design software application, where the layout has already been created. It is to be understood that a user alternatively may create a new, blank document, and may add layers and objects to that document. Although example embodiments are discussed in the context of a layout design software application, it is to be understood that embodiments may alternatively be employed in other types of applications.

Referring initially to FIG. 8, the method may begin, in block 802, by accessing a document. The document may be a new, blank document or it may be an existing document, in various embodiments. A document may be accessed, for example, from an operating system window, which may open the document using its source application. Alternatively, a document may be accessed from a "FILE—OPEN" operation within an open application, or by the user providing a uniform resource locator through interaction with a browser. Numerous ways of accessing an existing document may be supported.

Once a new or existing document has been accessed, then in block 804, a representation of the document may be displayed on the electronic device's display screen. The visual representation of a document, which is displayed at any given time, may be referred to herein as the "working document." A working document may be displayed as a composted document (e.g., FIGS. 4, 6, and 7) or as a set of layers (e.g., as in FIG. 3). Along with displaying the working document, in block 806, the application may provide one or more user interface elements enabling a user to edit the working document.

FIG. 9 illustrates a first depiction of a layout editing window 900 of a layout design software application, in accordance with the hypothetical example and an example embodiment. Layout editing window 900 may include a number of window elements, and a number of fields within which various types of information may be represented. In an embodiment, layout editing window 900 may include, for example but not by way of limitation, a toolbar field 902, a page setup field 904, an editing tool palate 906, and a document editing field 908. Some or all of these fields may include user interface elements, which enable the user to edit a displayed document.

Toolbar field 902 may include one or more elements (e.g., "File," "Edit," etc.), which when clicked, may produce a menu of selectable items. The selectable items may enable the user to access various features of the software application, and save or retrieve files or information, among other things. Page setup field 904 may include one or more elements, which enable page properties to be specified. Editing tool palate 906 may include one or more elements, which enable various editing tools and operations to be accessed.

Document editing field 908 may include a visual representation of a document 910, which further may include representations of one or more document layers and/or objects. In the illustrated example, document editing field 908 includes a representation of an advertisement layout. The document 910 currently displayed (e.g., the "working document") may or may not have been saved as a documents view.

Referring back to FIG. 8, in block 808, a determination may be made whether a user has provided one or more user inputs, which indicate that the user desires to edit the a view attribute or other attribute of the document, a layer, and/or an object. In an embodiment, the electronic device may generate instructions, based on the one or more user inputs, for the electronic device (or a remote device) to modify the attributes. When one or more edits have been indicated, then in block 810, the working document is updated by at least temporarily saving the modified attribute values. Upon updating the working document, or if no edits have been indicated, the method iterates as shown.

The modified attribute values may not be stored as a new view, at this point. In an embodiment, in block 820, the application may provide one or more user interface elements enabling a user to request creation of a new view of the document.

FIG. 10 illustrates layout editing window 1000, after a user has provided one or more user inputs to reveal a window element 1004 which enables the user to indicate that he would like to have the working document saved as a new view, in accordance with an example embodiment. For example, a user may cause a pop-up or drop-down menu, such as menu 1002, to be revealed. This may be accomplished by selecting an item from the task bar, for example. As another example, a user may move the pointer over the document, and right-click the mouse one time to reveal the menu 1002. Once the "Create New View" window element 1004 is revealed, the user may click on that element to cause the system to create a new view of the document.

Referring back to FIG. 8, in block 822, a determination may be made whether a user has provided one or more user inputs, which indicate that the user desires the system to create a new view. In an embodiment, the electronic device may generate instructions, based on the one or more user inputs, for the electronic device (or a remote device) to create the new view. When a request for a new view has been indicated, then in block 824, the system may save the new view by writing the document-level, layer-level, and/or object level view attribute values for the working document within the document as a new view (e.g., in view repository 260, FIG. 2). In an embodiment, an entire set of the document-level, layer-level, and/or object level view attribute values may be stored as part of the new view. In another embodiment, a subset of the document-level, layer-level, and/or object level view attribute values may be stored. For example, the subset may include the view attribute values that have been modified during the editing process. Upon initiating creation of a new view, or if a request for a new view has not been indicated, then the method iterates as shown.

In an embodiment, in block 830, the application may provide one or more user interface elements enabling a user to request that one or more existing views be displayed. At this time, a user may provide one or more user inputs, which indicate that the user desires to request display of one or more existing views.

Referring again to FIG. 10, a user may have provided one or more user inputs to reveal a window element 1006 which enables the user to indicate that he would like to have the system show the user one or more existing views, in accordance with an example embodiment. For example, a "Show Views . . ." window element 1006 may be revealed as part of menu 1002, or as part of another user interface element. Once the "Show Views . . ." window element 1006 is revealed, the user may click on that element to cause the system to display representations of one or more existing views of the document. A user may select a single view for viewing or may select multiple views for viewing, in various embodiments. When multiple views are selected, they may be displayed side-by-side or otherwise in proximity to each other, for example, to facilitate the user's comparison of the views.

Referring back to FIG. 8, in block 832, a determination may be made whether a user has provided one or more user inputs, which indicate that the user has requested that the system display one or more existing views. When no other views are requested, the method may iterate as shown. When one or more other views are requested, then in an embodiment, the electronic device may generate instructions, based on the one or more user inputs, for the electronic device (or a remote device) to display the view(s). When a request to display one or more existing views has been indicated, then in block 834, the requested views may be displayed. In an embodiment, to display a requested view, the system may read the view attribute values for the selected view from within the document (e.g., from view repository 260, FIG. 2), and may display a representation of the document view according to those view attribute values.

Figure 11:
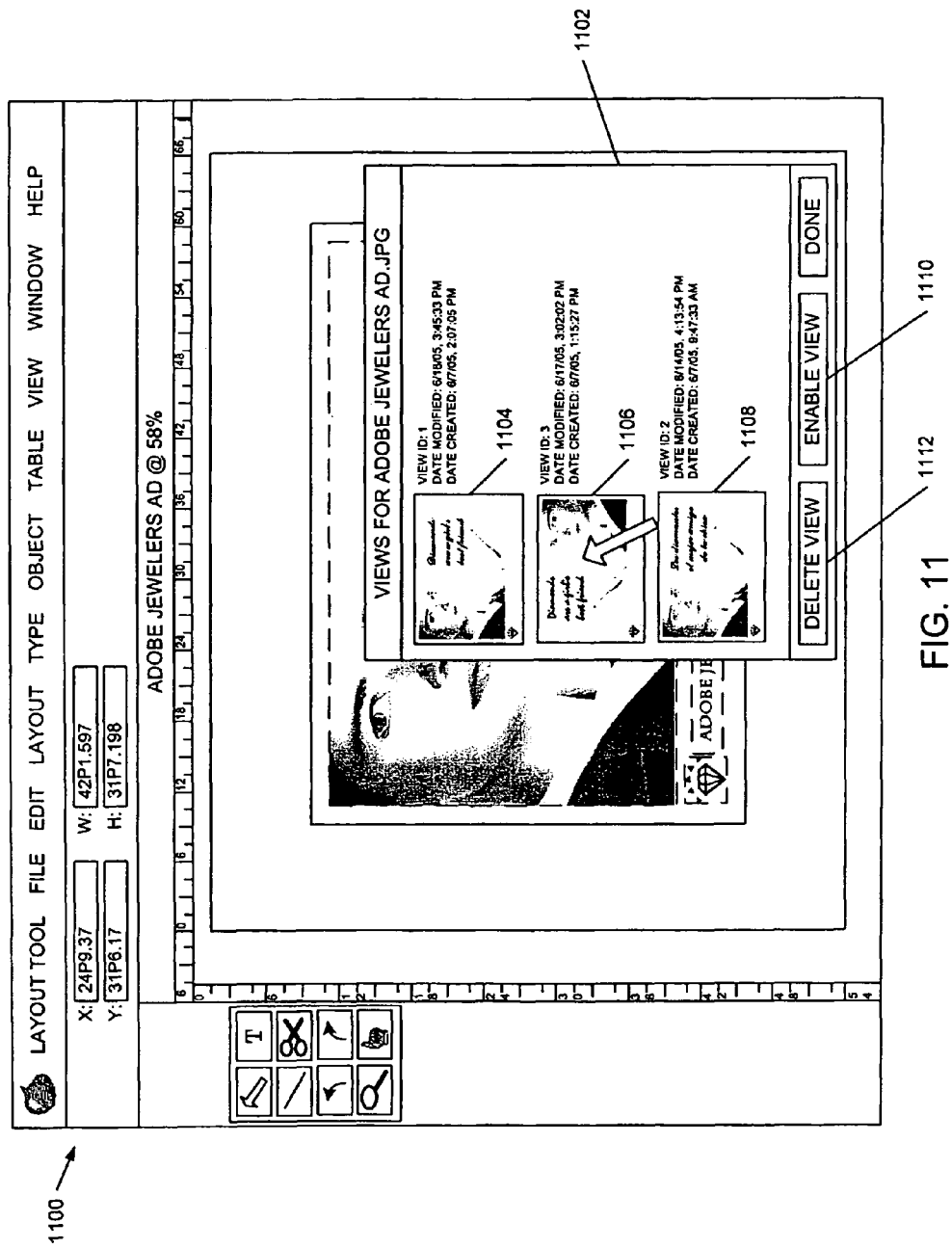
FIG. 11 illustrates layout editing window, after a user has provided one or more user inputs to request display of one or more document views, in accordance with an example embodiment.

FIG. 11 illustrates layout editing window 1100, after a user has provided one or more user inputs to request display of one or more document views, in accordance with an example embodiment. For example, a user may cause a pop-up window, such as window 1102, to be revealed. In window 1102, multiple views of the document are represented as thumbnails 1104, 1106, 1108. In an embodiment, a "thumbnail" is a selectable window element, which may include a visual indication of a document view. For example, thumbnail 1102 may show a reduced-size representation of a first document view. Similarly, thumbnail 1104 may show a reduced-size representation of a second document view, and thumbnail 1106 may show a reduced-size representation of a third document view. Use of thumbnails in conjunction with the various windows may enable a user to glean information about a document view, without having to enable the view. In other embodiments, document views may be represented using filenames, tiles, icons, or other representations.

A user may provide one or more user inputs to enable a view from the displayed document views. In an embodiment, for example, the user may move the pointer over a displayed document view (e.g., thumbnail 1106), and may double click on the view. Alternatively, the user may move the pointer over a selectable window element, such as "ENABLE VIEW" button 1110, and may click on that element.

In an embodiment, a user may also delete a view. For example, the user may click once on a view to select it, and then may press a "Delete" key on the keyboard. Alternatively, the user may move the pointer over a selectable window element, such as "DELETE VIEW" button 1112, and may click on that element. When a view is deleted, a status indicator may be updated in the document to indicate that the view is deleted. Alternatively, the view attribute values for the deleted view may be overwritten, or the view repository may otherwise be modified to reflect the deletion.

Referring back to FIG. 8, in block 836, a determination may be made whether a user has provided one or more user inputs, which indicate that the user has requested that the system enable another view. When a request to enable another view has been indicated, then in block 838, the working document may be updated to reflect the view that has been selected for enabling. In an embodiment, the view attributes of the enabled view are propagated through the document hierarchy and applied to corresponding elements, thus producing changes in the document. Upon updating the working document to reflect the newly enabled document view, or if another view has not been enabled, then the method iterates as shown. In an embodiment, a newly enabled document view may replace the displayed working document representation. In an alternate embodiment, a newly enabled document view may be displayed in a new window. The method illustrated in FIG. 8 may iterate until the user has indicated that he would like to quit the application, or until the application is otherwise terminated.

In the embodiments described above, a user may activate a particular view by providing a user input (e.g., by clicking on an "ACTIVATE VIEW" button). In an embodiment, a document may include one or more views that may be activated based on one or more additional actions. For example, but not by way of limitation, a particular document may have one or more "free" views and one or more "paid" views, in an embodiment. A "paid" view may be activated, for example, only when a user provides some form of payment in the context of a transaction.

In another embodiment, some or all views may include security attributes. A document creator or administrator may restrict access to selected views based on the access privileges of a user. Each user may be able to view only those views of a document for which he or she has access privileges. This enables a single document to be sent to multiple users, and the document to be viewable differently based on the user's access privileges.

Besides the capabilities mentioned above, a software application that supports document views may also provide a user with one or more user interfaces that enable the user to edit view attributes. Editing view attributes may include, for example, but not by way of limitation, designating a particular attribute as a view attribute, un-designating a view attribute (e.g., converting a view attribute into a regular attribute), and/or setting or altering a value of a view attribute. Referring again to FIG. 10, for example, a window element 1008 may be provided, which enables the user to indicate that he would like to edit a view attribute, in accordance with an example embodiment. For example, an "Edit View Attribute . . ." window element 1008 may be revealed as part of menu 1002, or as part of another user interface element. Once the "Edit View Attribute . . ." window element 1008 is revealed, the user may click on that element to cause the system to display information prompting the user to edit view attributes.

In another embodiment, a software application which supports document views may also provide an ability to create a slide show from a document. For example, each slide may be represented by one of multiple views of the document. A user may include slide show contents on different layers of the document, and each layer may be designated as visible or not visible for a particular view, depending on whether the layer is to be viewable in a particular slide. These views may be activated in a sequential manner to create a slide show effect. The document may include a single instance of the content of a layer or object that is common across multiple slides (e.g., headers, background, borders, and so on), thus potentially reducing the size of the document.

Figure 12:
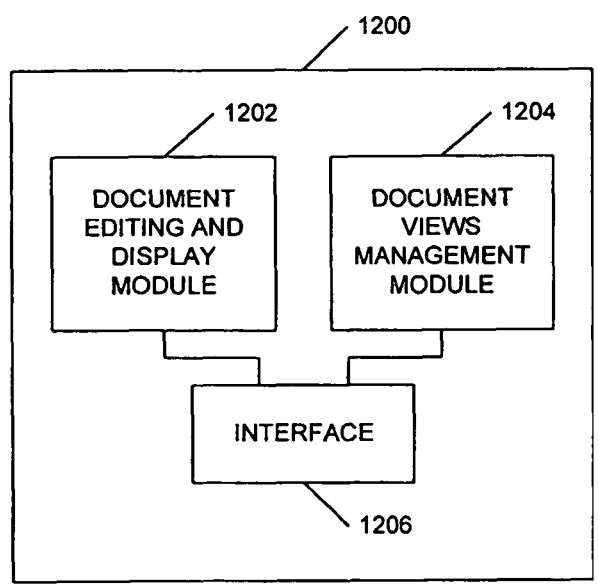
FIG. 12 illustrates a conceptual diagram of a document editing and/or view management system, in accordance with an example embodiment.

As discussed previously, one or more software applications may implement methods of the various embodiments. FIG. 12 is a simplified, block diagram of a document editing and/or view management system 1200, in accordance with an example embodiment. System 1200 may include one or more document editing and display modules 1202, one or more document views management modules 1204, and an interface 1206, in an embodiment.

A document editing and display module 1202 is to facilitate providing access to documents, display of documents, and editing of documents, in an embodiment. For example, but not by way of limitation, a document editing and display module 1202 may perform some or all of the processes indicated in blocks 802, 804, 806, 808, and 810 of FIG. 8.

Document views management module 1204 is to create a new view of a document by embedding information defining the new view within the document, to enable a selected view of the document, and to provide one or more user interface elements enabling a user to cause module 1204 to perform these activities. Accordingly, in an embodiment, document views management module 1204 may include a means for creating a new view, a means for enabling a selected view, and a means for providing user interface elements. For example, but not by way of limitation, a document views management module 1204 may perform some or all of the processes indicated in blocks 820, 822, 824, 830, 832, 834, 836, and 838 of FIG. 8.

Interface 1206 is to receive one or more instructions, based on one or more user inputs, to cause document editing and display module 1202 and/or document views management module 1204 to perform some or all of the functions described above. Accordingly, in an embodiment, interface 1206 includes a means for receiving one or more instructions.

In the examples above, a single user or multiple users may have contributed to the creation and editing of a document, the creation of document views, and other activities. In an embodiment, upon opening a document that includes multiple views, the user may be provided with information indicating that multiple views exist for the document, and/or that a change regarding document views has occurred. For example, but not by way of limitation, a user may be provided with an indication that a new view has been created since the last time the user accessed the document, in an embodiment. In an embodiment, the new view may automatically be reflected in the displayed document. In an alternate embodiment, the user may be provided with an ability to request that the new view be reflected in the displayed document.

In some cases, embodiments of the inventive subject matter may be carried out substantially on a single computer (e.g., computer 100, FIG. 1). Accordingly, a document that includes multiple document views may be stored within and/or edited on this computer. This "stand-alone system configuration" represents an embodiment of a system upon which embodiments of the inventive subject matter may be carried out. Other system embodiments include, but are not limited to, "user-based" system configurations and "network-based" system configurations.

Figure 13:
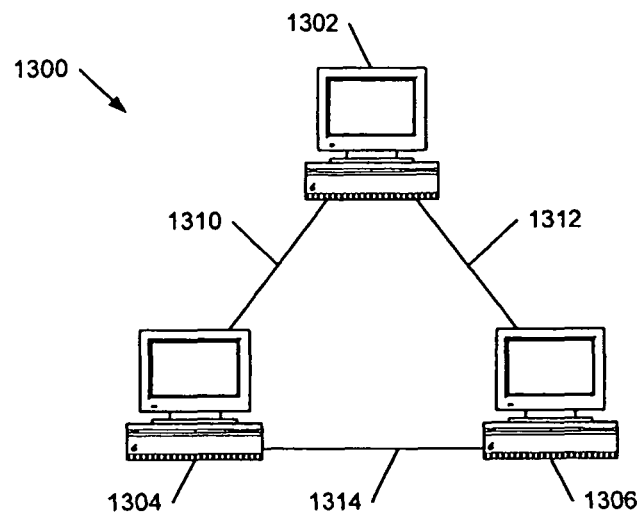
FIG. 13 is a diagram illustrating a user-based system configuration, in accordance with an example embodiment.

FIG. 13 is a diagram illustrating a user-based system configuration 1300, in accordance with an example embodiment. A user-based system configuration 1300 may include multiple computers 1302, 1304, 1306 or other electronic devices, which may communicate with one another over wired or wireless communication links 1310, 1312, 1314. In such a configuration, projects and/or assets may be stored on one or more of the multiple computers 1302, 1304, 1306, and may be accessed by the other computers. Computers 1302, 1304, 1306 each may execute applications having capabilities of designating alternates, and/or accessing alternates within a document being edited, and/or supporting a communication protocol such as, for example, a Web Distributed Authoring and Versioning (WebDAV) protocol.

Figure 14:
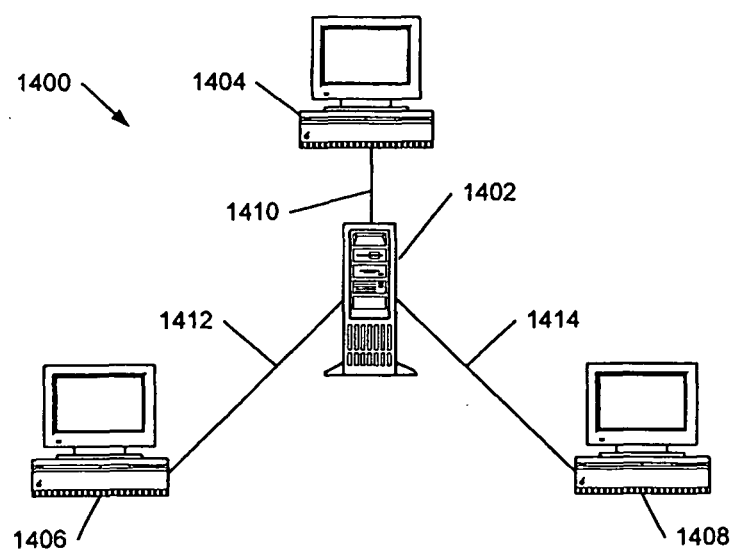
FIG. 14 is a diagram illustrating a network-based system configuration, in accordance with an example embodiment.

FIG. 14 is a diagram illustrating a network-based system configuration 1400, in accordance with an example embodiment. A network-based system configuration 1400 may include a server 1402 and one or more client computers 1404, 1406, 1408 or other electronic devices, which communicate with server 1402 over wired or wireless communication links 1410, 1412, 1414. In various embodiments, configuration 1400 may include a local area network (LAN), a wide area network (WAN), the internet, and any number of routers, repeaters, relays or other intermediate nodes. In such a configuration, projects and/or assets may be stored on server 1402, and may be accessed by a browser on a client computer 1404, 1406, 1408, for example.

In a stand-alone configuration or in the configurations illustrated in conjunction with FIGS. 13 and 14, user inputs which indicate a user's intention to have the system perform an action (e.g., create a new view, display views, and/or enable a view) may be received at a first electronic device, which may generate instructions based on the user inputs. In a user-based or network-based configuration, the instructions may be communicated over a communication link to a second electronic device (e.g., a server or another computer), where the second electronic device executes the instructions based on the information.

Various embodiments of methods and apparatus regarding document views have been described above. As discussed previously, multiple views may be stored within a single document. This may have an advantage of eliminating a need to maintain multiple copies of a document with substantially similar content but different layouts, for example. The foregoing description of specific embodiments reveals the general nature of the inventive subject matter sufficiently that others can, by applying current knowledge, readily modify and/or adapt it for various applications without departing from the generic concept. Therefore, such adaptations and modifications are within the meaning and range of equivalents of the disclosed embodiments. The phraseology or terminology employed herein is for the purpose of description and not of limitation. Accordingly, the inventive subject matter embraces all such alternatives, modifications, equivalents and variations as fall within the spirit and broad scope of the appended claims.

Method embodiments described herein may be computer-implemented. Some embodiments may include tangible computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

In the foregoing description of various embodiments, reference is made to the accompanying drawings, which form a part hereof and show, by way of illustration, specific embodiments in which the inventive subject matter may be practiced. Various embodiments are described in sufficient detail to enable those skilled in the art to practice the inventive subject matter, and it is to be understood that other embodiments may be utilized, and that process or mechanical changes may be made, without departing from the scope of the inventive subject matter.

Embodiments of the inventive subject matter may be referred to, individually and/or collectively, herein by the term "invention" merely for convenience and without intending to voluntarily limit the scope of this application to any single invention or inventive concept if more than one is, in fact, disclosed. It will be recognized that the methods of various embodiments can be combined in practice, either concurrently or in succession. Various permutations and combinations may be readily apparent to those skilled in the art.

What is claimed is:

1. A computer-implemented method comprising:
    storing, within a document that includes a plurality of objects, a first document view along with a second document view, the first document view being a first arrangement of the plurality of objects, the first arrangement being specified as a first set of values for view attributes of the plurality of objects, the first document view including a first value for a view attribute associated with an object of the plurality of objects, the second document view being a second arrangement of the plurality of objects distinct from the first arrangement, the second arrangement being specified as a second set of values for the view attributes of the plurality of objects, the second document view including a second value for the view attribute associated with the object, the view attribute including a data element that affects how the object is rendered; and
    storing the first and second document view within a view repository of the document, wherein the view repository includes a data structure, which associates, for each object, the view attribute of the object identifying a type of view with a view identifier and attribute values.

2. The computer-implemented method of claim 1, wherein the view attribute of the object includes a layer attribute of the object.

3. The computer-implemented method of claim 1, wherein storing the first document view comprises:
    storing the first document view as embedded information within the document.

4. The computer-implemented method of claim 1, further comprising:
    providing one or more user interface elements to enable a user to create the first document view based on a displayed version of the document.

5. The computer-implemented method of claim 1, further comprising:
    receiving one or more user inputs, which indicate that the first document view is to be created, wherein the storing of the first document view is performed in response to receiving the one or more user inputs.

6. The computer-implemented method of claim 1, further comprising:
    providing one or more user interface elements to enable a user to request that the first document view or the second document view is displayed.

7. The computer-implemented method of claim 1, further comprising:
    receiving one or more user inputs, which indicate that the first document view or the second document view is to be displayed; and
    displaying the first document view or the second document view in response to receiving the one or more user inputs.

8. The computer-implemented method of claim 1, further comprising:
    receiving one or more user inputs, which indicate that the first document view and the second document view is to be displayed; and
    displaying the document view and the second document view in response to receiving the one or more user inputs.

9. The computer-implemented method of claim 8, wherein the displaying comprises:
    displaying the document view and the second document view as thumbnails.

10. The computer-implemented method of claim 1, further comprising:
    receiving one or more user inputs, which indicate that a selected one of the first document view or the second document view is to be enabled; and
    enabling the selected one in response to receiving the one or more user inputs.

11. The computer-implemented method of claim 10, further comprising:
    in response to the enabling, displaying the selected one.

12. The computer-implemented method of claim 1, wherein the first document view further includes one or more third values, one or more fourth values, and one or more fifth values, and wherein the storing comprises:
    storing the one or more third values for one or more document-level view attributes;
    storing the one or more fourth values for one or more layer-level view attributes; and
    storing the one or more fifth values for one or more object-level view attributes.

13. The computer-implemented method of claim 1, wherein the view attribute may include an attribute selected from a group of attributes that includes position, co-ordinates, bounding box, height, width, printability, transformation, visibility, transparency, opacity, color, font, point size, bold, italic, scale, background, clipping, stacking order, layer effects, paper size, and margins.

14. A computer-implemented method comprising:
    accessing a document, by an electronic device, wherein the document includes a plurality of objects and includes embedded information defining multiple document views, each of the multiple document views being a distinct arrangement of the plurality of objects specified as a distinct set of values for view attributes of the plurality of objects, each of the multiple document views including a view attribute associated with an object of the plurality of objects;
    receiving a request of an identified document view from the multiple document views selected for display on the electronic device;
    displaying a representation of the document on the electronic device, wherein the representation is affected by view attribute values associated with the plurality of objects of the identified document view; and
    storing the multiple document views within a view repository of the document, wherein the view repository includes a data structure, which associates, for each object, the view attribute of the object identifying a type of view with a view identifier and attribute values.

15. The computer-implemented method of claim 14, further comprising:
   receiving one or more user inputs, which instruct the electronic device to display representations of one or more other document views; and
   in response to receiving the one or more user inputs, displaying the representations of the one or more other document views, wherein the representations are affected by view attribute values of the one or more other document views.

16. The computer-implemented method of claim 14, further comprising:
   receiving one or more user inputs, which indicate that the document is to be edited, resulting in a modified representation of the document being displayed;
   receiving one or more additional user inputs, which indicate that a new view is to be created based on the modified representation of the document; and
   in response to receiving the one or more additional user inputs, storing additional embedded information as a new view within the document, wherein the new view affects display of the modified representation.

17. The computer-implemented method of claim 14, further comprising:
   receiving one or more user inputs, which indicate that a selected one of the multiple document views is to be enabled; and
   enabling the selected one in response to receiving the one or more user inputs.

18. The computer-implemented method of claim 17, further comprising: in response to the enabling, displaying the selected one.

19. The computer-implemented method of claim 14, wherein displaying the representation of the document comprises displaying a representation of a structured document.

20. A non-transitory computer-readable medium encoded with a computer program, comprising instructions operable to cause an electronic device to:
   store, within a document that includes a plurality of objects, a first document view along with a second document view, the first document view being a first arrangement of the plurality of objects, the first arrangement being specified as a first set of values for view attributes of the plurality of objects, the first document view including a first value for a view attribute associated with an object of the plurality of objects, the second document view being a second arrangement of the plurality of objects distinct from the first arrangement, the second arrangement being specified as a second set of values for the view attributes of the plurality of objects, the second document view including a second value for the view attribute associated with the object, the view attribute including a data element that affects how the object is rendered; and
   store the first document view within a view repository of the document, wherein the view repository includes a data structure, which associates, for each object, the view attribute of the object identifying a type of view with a view identifier and attribute values.

21. The non-transitory computer-readable medium of claim 20, wherein the instructions further are operable to cause the electronic device to:
   receive one or more user inputs, which indicate that the first document view is to be created, wherein storing is performed in response to receiving the one or more user inputs.

22. The non-transitory computer-readable medium of claim 20, wherein the instructions further are operable to cause the electronic device to:
   receive one or more user inputs, which indicate that the first document view or the second document view is to be displayed; and
   display the first document view or the second document view in response to receiving the one or more user inputs.

23. The non-transitory computer-readable medium of claim 20, wherein the instructions further are operable to cause the electronic device to:
   receive one or more user inputs, which indicate that the first document view and the second document view are to be displayed; and
   display the first document view and the second document view in response to receiving the one or more user inputs.

24. The non-transitory computer-readable medium of claim 20, wherein the instructions further are operable to cause the electronic device to:
   receive one or more user inputs, which indicate that a selected one of the first document view or second document view is to be enabled; and
   enable the selected one in response to receiving the one or more user inputs.

25. A non-transitory computer-readable medium, with instructions stored thereon which when executed by a processor of a computer, causes the computer to:
   present one or more user interface elements to enable a user to indicate that a document view of a document is to be displayed, wherein the document includes a plurality of objects and includes embedded information defining the document view and a further document view of the document, wherein the document view and the further document view are distinct arrangements of the plurality of objects, wherein the embedded information includes a first collection of values for view attributes of the plurality of objects, wherein the embedded information includes a second collection of values for the view attributes of the plurality of objects, and wherein a view attribute of an object of the plurality of objects includes a data element that affects how the object is rendered;
   store the document view within a view repository of the document, wherein the view repository includes a data structure, which associates, for each object, the view attribute of the object identifying a type of view with a view identifier and attribute values;
   present a window element within which a representation of the document view is displayable;
   present an additional window element within which a thumbnail representation of the at least one other document view is displayable, the thumbnail representation including a reduced-size representation of the other document view; and
   display the view identifier, a creation date of the document view corresponding to the view identifier, a last modification date of the document view corresponding to the view identifier, the view identifier, creation date, and last modification date displayed adjacent to the corresponding thumbnail representation within the additional window element.

26. The non-transitory computer-readable medium of claim 25, further comprising:

presenting one or more additional user interface elements to enable the user to create a new document view of the document from a displayed representation of the document.

27. The non-transitory computer-readable medium of claim 25, further comprising:
presenting one or more additional user interface elements to enable the user to enable the further document view of the document.

28. A non-transitory computer-readable medium encoded with a document comprising:
a plurality of objects, the plurality of objects including an object;
embedded information, which defines a first document view and a second document view, the first and second document views being distinct arrangements of the plurality of objects, the first document view being specified as a first set of values for view attributes of the plurality of objects, the second document view being specified as a second set of values for the view attributes of the plurality of objects, wherein the embedded information includes a first value for a view attribute associated with the object and with the first document view, wherein the embedded information includes a second value for the view attribute associated with the object and with the second document view, and wherein the view attribute includes a data element that affects how the object is rendered; and
a view repository in the embedded information, the view repository including a data structure that associates, for each object, an object display attribute identifying a type of view with a first view identifier, a first object display attribute value, a second view identifier, and a second object display attribute value.

29. The non-transitory computer-readable medium of claim 28, wherein the data structure further associates a document size attribute with a first view identifier, a first document size attribute value, a second view identifier, and a second document size attribute value.

30. The non-transitory computer-readable medium of claim 28, wherein the view attribute may include an attribute selected from a group of attributes that includes position, co-ordinates, bounding box, height, width, printability, transformation, visibility, transparency, opacity, color, font, point size, bold, italic, scale, background, clipping, stacking order, layer effects, paper size, and margins.

31. The non-transitory computer-readable medium of claim 28, wherein the object may include an object selected from a group of object types that includes document objects, page objects, column objects, paragraph objects, line objects, word objects, glyph objects, graphical objects, path objects, text objects, image objects, page contents objects, text characters, words, graphical objects, commands, image objects, bitmaps, font objects, and user-specified objects.

32. A document view management system comprising:
a processor comprising a document views management module configured to create a new view of a document by embedding information defining the new view within the document, to enable a selected view of the document, to provide user interface elements enabling a user to cause the document views management module to create the new view and to enable the selected view, the document including a plurality of objects, the new view and the selected view being distinct arrangements of the plurality of objects, the new view being specified as a first set of values for view attributes of the plurality of objects, the selected view being specified as a second set of values for the view attributes of the plurality of objects, and to store the new view of the document with the selected view of the document within a same view repository of the document, the view repository including a data structure, which associates, for each object from the new view and the selected view, the view attribute of the object identifying a type of view with a first and second view identifier and first and second attribute values; and
an interface to receive one or more instructions, based on one or more user inputs, to cause the processor-implemented document views management module to create the new view and to enable the selected view, wherein the new view includes a value for a view attribute associated with an object of the plurality of objects included in the document.

33. A document view management system comprising:
first means for creating, using one or more processors, a new view of a document by embedding information defining the new view within the document, for enabling a selected view of the document, for providing user interface elements enabling a user to cause the first means to create the new view and to enable the selected view, the document including a plurality of objects, the new view and the selected view being distinct arrangements of the plurality of objects, the new view being specified as a first set of values for view attributes of the plurality of objects, the selected view being specified as a second set of values for the view attributes of the plurality of objects;
second means for receiving one or more instructions, based on one or more user inputs, to cause the first means to create the new view and to enable the selected view, wherein the new view includes a value for a view attribute associated with an object of the plurality of objects included in the document; and
third means for storing the new view of the document with the selected view of the document within a same view repository of the document, the view repository including a data structure, which associates, for each object from the new view and the selected view, the view attribute of the object identifying a type of view with a first and second view identifier and first and second attribute values.

\* \* \* \* \*